(12) United States Patent
Rotvold et al.

(10) Patent No.: US 7,421,531 B2
(45) Date of Patent: Sep. 2, 2008

(54) ISOLATING SYSTEM THAT COUPLES FIELDBUS DATA TO A NETWORK

(75) Inventors: Eric Darrell Rotvold, Inver Grove Heights, MN (US); John P. Brewer, Chaska, MN (US); Clarence Edward Holmstadt, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 178 days.

(21) Appl. No.: 11/034,177

(22) Filed: Jan. 12, 2005

(65) Prior Publication Data

US 2006/0155908 A1 Jul. 13, 2006

(51) Int. Cl.
*G06F 13/14* (2006.01)
*G06F 1/00* (2006.01)

(52) U.S. Cl. .................. 710/305; 710/105; 713/340

(58) Field of Classification Search ......... 710/305–306, 710/311, 313, 315; 713/323, 324, 340; 307/91; 257/508, 659–660; 363/15–33, 21.01
See application file for complete search history.

(56) References Cited

U.S. PATENT DOCUMENTS

| | | | |
|---|---|---|---|
| 5,442,639 A | 8/1995 | Crowder et al. | |
| 5,903,455 A * | 5/1999 | Sharpe et al. | 700/83 |
| 5,923,557 A * | 7/1999 | Eidson | 700/129 |
| 6,087,882 A * | 7/2000 | Chen et al. | 327/333 |
| 6,125,448 A | 9/2000 | Schwan et al. | |
| 6,253,329 B1 * | 6/2001 | Kang | 713/300 |
| 6,291,907 B1 * | 9/2001 | Haigh et al. | 307/91 |
| 6,304,934 B1 | 10/2001 | Pimenta et al. | |
| 6,396,391 B1 | 5/2002 | Binder | |
| 6,405,139 B1 | 6/2002 | Kicinski et al. | |
| 6,525,915 B1 | 2/2003 | Graube | |
| 6,781,256 B2 * | 8/2004 | Loechner | 307/46 |
| 6,839,790 B2 * | 1/2005 | Barros De Almeida et al. | 710/305 |
| 2002/0105227 A1 | 8/2002 | Nerone et al. | |
| 2002/0147852 A1 * | 10/2002 | Nasman et al. | 709/251 |
| 2003/0236937 A1 | 12/2003 | Barros de Almeida et al. | |
| 2004/0153594 A1 | 8/2004 | Rotvold et al. | |
| 2004/0156496 A1 | 8/2004 | Karam | |
| 2005/0234681 A1 * | 10/2005 | Johnson et al. | 702/188 |

OTHER PUBLICATIONS

Protecting CAN bus with Digital Isolation, Scott Wayne, Analog Devices, Inc.*
Definition of Fieldbus from Wikipedia, <http://en.wikipedia.org/wiki/Fieldbus>, accessed on Aug. 7, 2006.*

(Continued)

*Primary Examiner*—Khanh Dang
(74) *Attorney, Agent, or Firm*—Westman, Champlin & Kelly, P.A.

(57) ABSTRACT

A system couples fieldbus data from a fieldbus line to a network line. The system includes a data format converter that converts the data to USB data. A coupler that includes a first insulating barrier is coupled in cascade with the converter. A host receives the USB data. The host has a data server interface and a network connection. The data server interface presents the data to the network line. A regulator couples power between the host and the fieldbus line with the regulator including a second insulating barrier. Data and power are isolatingly coupled between the fieldbus line and the network line.

34 Claims, 6 Drawing Sheets

OTHER PUBLICATIONS

Notification of Transmittal of the International Search Report and the Written Opinion of the International Searching Authority, or the Declaration for International Application No. PCT/US2005/045679, filed Dec. 19, 2005. Date of Mailing: Apr. 19, 2006.

Reference Manual 00809-0100-4728, Rev. JA, Jan. 2004, Rosemount 644, Emerson Process Management, Section 4, "Foundation Fieldbus Configuration," pp. 1-24.

Reference Manual 00809-0100-4023, Rev. AA, May 2003, Rosemount 3420, Emerson Process Management, "Rosemount 3420 Fieldbus Interface Module," 49 pages.

Burr-Brown, DCP0105 Series, "Miniature 5V Input, 1W Isolated Unregulated DC/DC Converters," 19 pages, 2003.

Analog Devices, Triple-Channel Digital Isolators, "AduM1300/AduM1301," 12 pages, 2004.

Analog Devices, webpage, "Data Converter", Jun. 8, 2004, 1 page.

* cited by examiner

ISOLATING SYSTEM THAT COUPLES FIELDBUS DATA TO A NETWORK

BACKGROUND OF THE INVENTION

Fieldbus networks provide communications for process plant equipment such as pressure, temperature and flow transmitters and valve actuators. Fieldbus networks typically extend over wide areas of a process plant environment. Control networks perform higher level process control functions and are typically located in one or more control rooms that are located away from the process plant environment.

The fieldbus network carries real time process data from the transmitters and actuators. There is a desire to transfer or "bridge" the real time process data from the fieldbus network to the control network so that the control network can quickly access information on conditions in the process plant.

If the fieldbus network and the control network are "bridged" or connected by conventional connections, however, the results are not satisfactory. The fieldbus network is typically grounded to a point in the process plant environment (process ground), and the control network in grounded to a point in the control room environment (control network ground). When the fieldbus network and the control network are bridged, an undesired ground loop is formed. Differences in potential between the process ground and the control network ground cause noise currents to flow over network ground conductors. The noise can result in poor performance of both the fieldbus network and the control network.

In addition, the data on the fieldbus network is formatted according to a fieldbus data format or protocol which is typically not compatible with data formatting in the control network. Data format conversion is needed in order to transfer data from the fieldbus network to the control network. Data format conversion, however, requires power and supplying the power needed to convert the data can result in drawing an excessive amount of power from the fieldbus network, or a further undesired ground loop.

A system is desired that transfers data from a fieldbus network to a control network without introducing undesired ground loops along either a data format conversion path through the system or a power supply path through the system.

SUMMARY OF THE INVENTION

Disclosed is a system for coupling data received in fieldbus format from a fieldbus interface to a network connection. The system comprises a data format converter coupled between the fieldbus interface and a bridge USB interface. The converter converts the data to USB-formatted data. A coupler is coupled in cascade with the converter. The coupler includes a first insulating barrier.

The system comprises a host that receives the USB-formatted data, and that includes a data server interface presenting the data to the network connection. The system also comprises a regulator that couples power between the bridge USB interface and the fieldbus interface. The regulator includes a second insulating barrier. With the use of the first and second insulating barriers, both data and power are isolatingly coupled between the fieldbus interface and the bridge USB interface.

Other features and benefits will be apparent upon reading the following detailed description and review of the associated drawings.

DETAILED DESCRIPTION OF THE PREFERRED EMBODIMENTS

Figure 1:
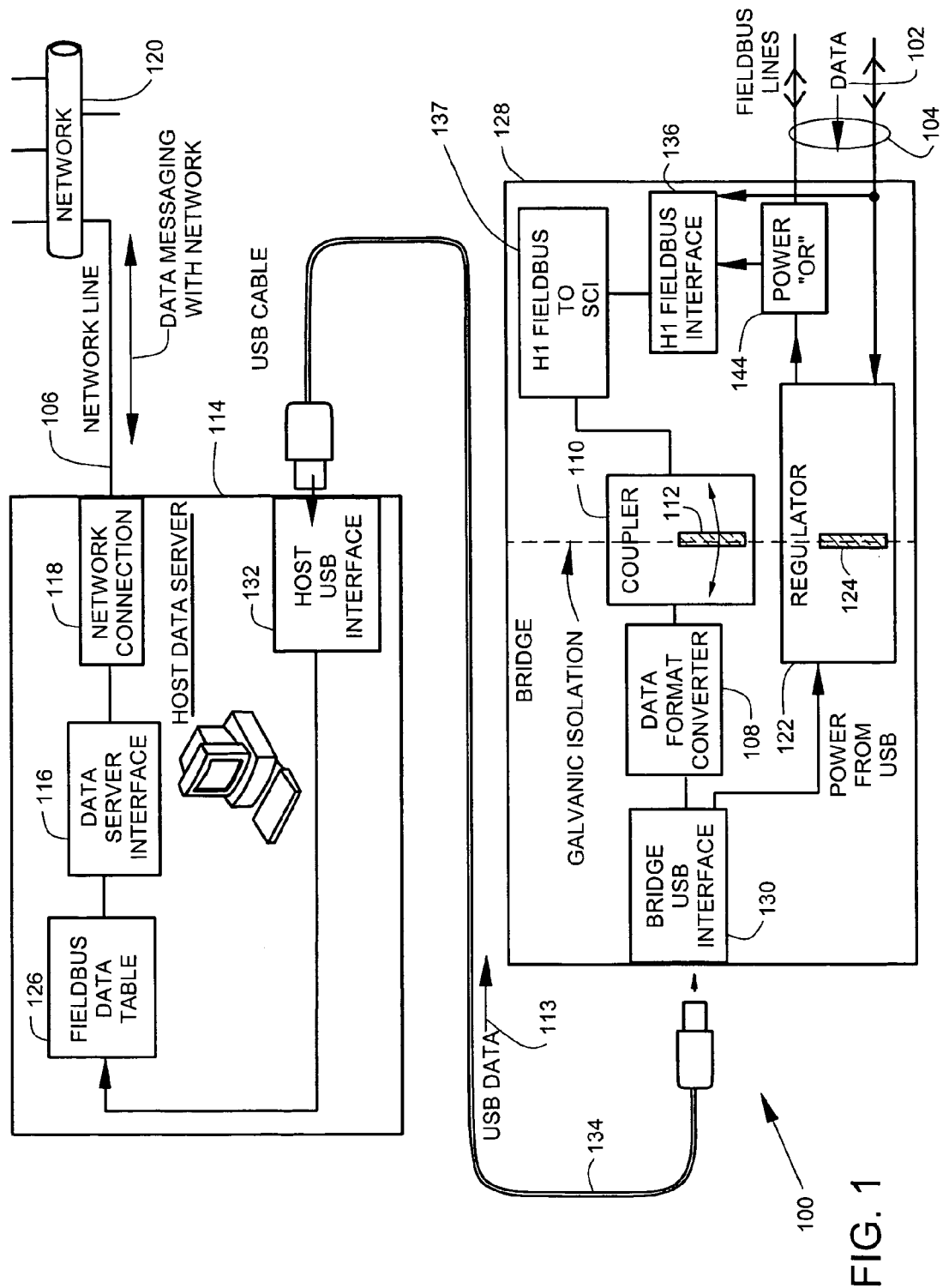
FIG. 1 illustrates a bridge and a host data server coupled between a process control bus and a network.

FIG. 1 illustrates a system 100 for coupling data 102 that is received from fieldbus lines 104 to a network line 106 which couples the data to a control network 120. The data 102 typically comprises real time process variables such as pressure, temperature, flow, valve settings and the like that are generated by field devices such as process transmitters (not illustrated) or control valves (not illustrated) that are connected to the fieldbus lines 104. The control network 120, on the other hand, typically comprises a network that is operating at a higher system control level compared to the fieldbus network.

There is a need to pass data between the fieldbus lines 104 and the network line 106 so that the network 120 has access to real time data from the field devices. If the fieldbus lines 104 were to be directly connected to (or were to share a common conductor with) the network line 106, an electrical ground loop would be formed that would introduce noise into both the network line 106 and the fieldbus lines 104. The noise has a potential to cause the network 120 or a field device connected to the fieldbus line to malfunction.

As explained below, the system 100 shown in FIG. 1 avoids such a direct connection (or shared common conductor) by providing a first galvanic isolation barrier for data communication. The circuit shown in FIG. 1 requires electrical power for its own operation. As explained below, the system 100 in FIG. 1 also couples power through a second galvanic isolation barrier to avoid ground loops along both a data format conversion path and a power supply path.

The system 100 reformats the fieldbus data 102 for network compatibility. The system 100 converts data 102, which is formatted according to a fieldbus protocol, into data messaging on the network line 106 that is formatted in a standard networking protocol such as HSE (FF High Speed Ethernet), OPC (OLE for Process control), Modbus TCP, HTTP, FTP, Web service or other standard protocol. The system 100 provides galvanic isolation between the fieldbus lines 104 and the network line 106. The system 100 also provides a galvanically isolated flexible power regulation arrangement for powering data conversion using power from multiple alternate fieldbus or USB power sources.

The system 100 preferably includes a cascade of data handling stages that include an H1 fieldbus interface 136, an H1-Fieldbus-to-SCI converter 137, an SCI-to-USB converter 108 and a USB interface 130. The SCI-to-USB converter 108, and the H1-Fieldbus-to-SCI converter 137 perform successive conversion steps that convert the data 102, which is in a fieldbus protocol, to USB data 113 which is in universal serial bus (USB) protocol.

The coupler 110 includes a first insulating barrier 112 that provides galvanic isolation between the circuits 137, 136, 144 that are electrically connected to the fieldbus lines 104 vis-a-vis the circuit 108 that is electrically connected to the USB interface 130. The insulating barrier 112 in the coupler 110 couples data, but prevents electrical current from flowing through the barrier 112. The insulating barrier 112 prevents a ground loop along the data handling path. The coupler 110 preferably comprises a bidirectional magnetoresistive coupler or a bidirectional optical coupler. Data flows through the insulating barrier 112 in optical or magnetic form rather than in the form of an electrical current or voltage.

A host data server 114, which is preferably a personal computer, receives the USB data 113. The host 114 includes a data server interface 116 and a network connection 118. The data server interface 116 presents reformatted and isolated data that originated at the fieldbus 104 to the network connection 118. The host 114 preferably comprises a fieldbus data table 126 coupled to the data server interface 116. Data fields in the fieldbus data table 126 are updated by USB data 113. The network connection 118 connects to the network line 106. The network line 106 couples to a network 120. The network 120 can access the data 102 by messaging with the data server interface 116 over the network line 106 and the network connection 118.

The system 100 also includes a regulator 122. The regulator 122 couples power between the host 114 and the fieldbus lines 104. The regulator 122 includes a second insulating barrier 124. The second insulating barrier 124 preferably comprises insulation material separating primary and secondary windings of an isolated power transformer. The second insulating barrier 124 couples power, but prevents electric current from flowing through the barrier 124. Power flows across the insulating barrier 124 in the form of a magnetic field rather than an electric current or voltage. The insulating barrier 124 in the regulator 122 couples power, but prevents electrical current from flowing through the barrier 124. The insulating barrier 124 prevents a ground loop along the regulator path. In a preferred arrangement, the converter 108, the coupler 110 and the regulator 122 are assembled into a bridge 128. The bridge 128 is galvanically isolating with respect to both data and power transmission.

In this embodiment, the first USB interface 130 couples data from the converter 108 to the host 114, and couples power from the host 114 to the regulator 122. The host comprises a second USB interface 132 that couples data and power to the bridge 128. The system 100 includes a USB cable 134 coupled between the first USB interface 130 and the second USB interface 132 for carrying both data and power. Data can flow in a single direction from the fieldbus lines 104 to the network 120, or can flow bidirectionally between the fieldbus lines 104 and the network 120.

The bridge 128 galvanically isolates fieldbus lines 104 from the USB interface 130. The bridge 128 is a barrier to current flow between the fieldbus lines 104 and the USB interface 130. The bridge 128, however, allows both data and power (energization) to flow between the fieldbus connection 136 and the USB interface 130. The bridge 128 is described in more detail below by way of an example illustrated in FIGS. 2-3.

Figure 2:
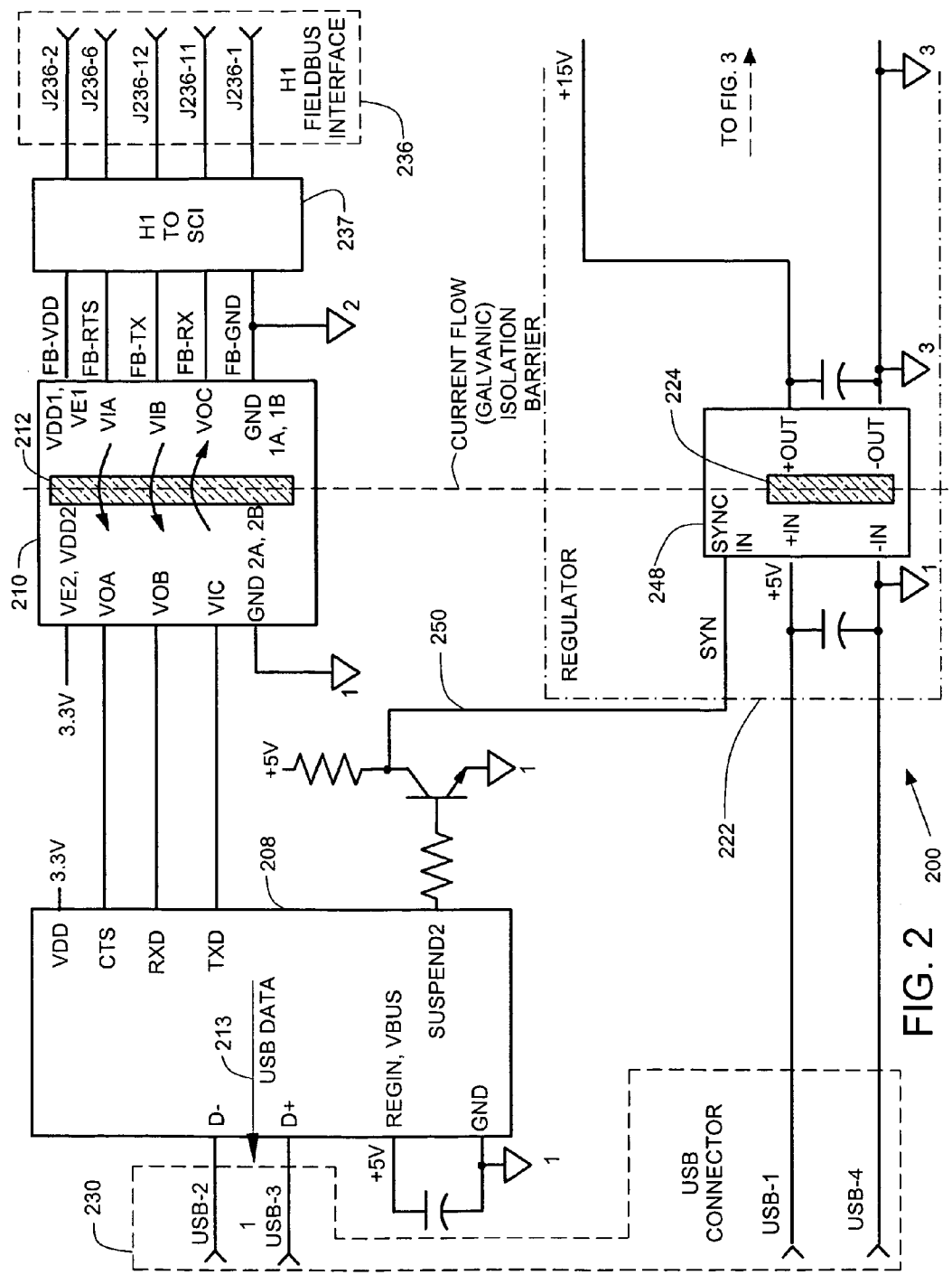
FIGS. 2-3 illustrate a detailed schematic of a first embodiment of a bridge.
Figure 3:
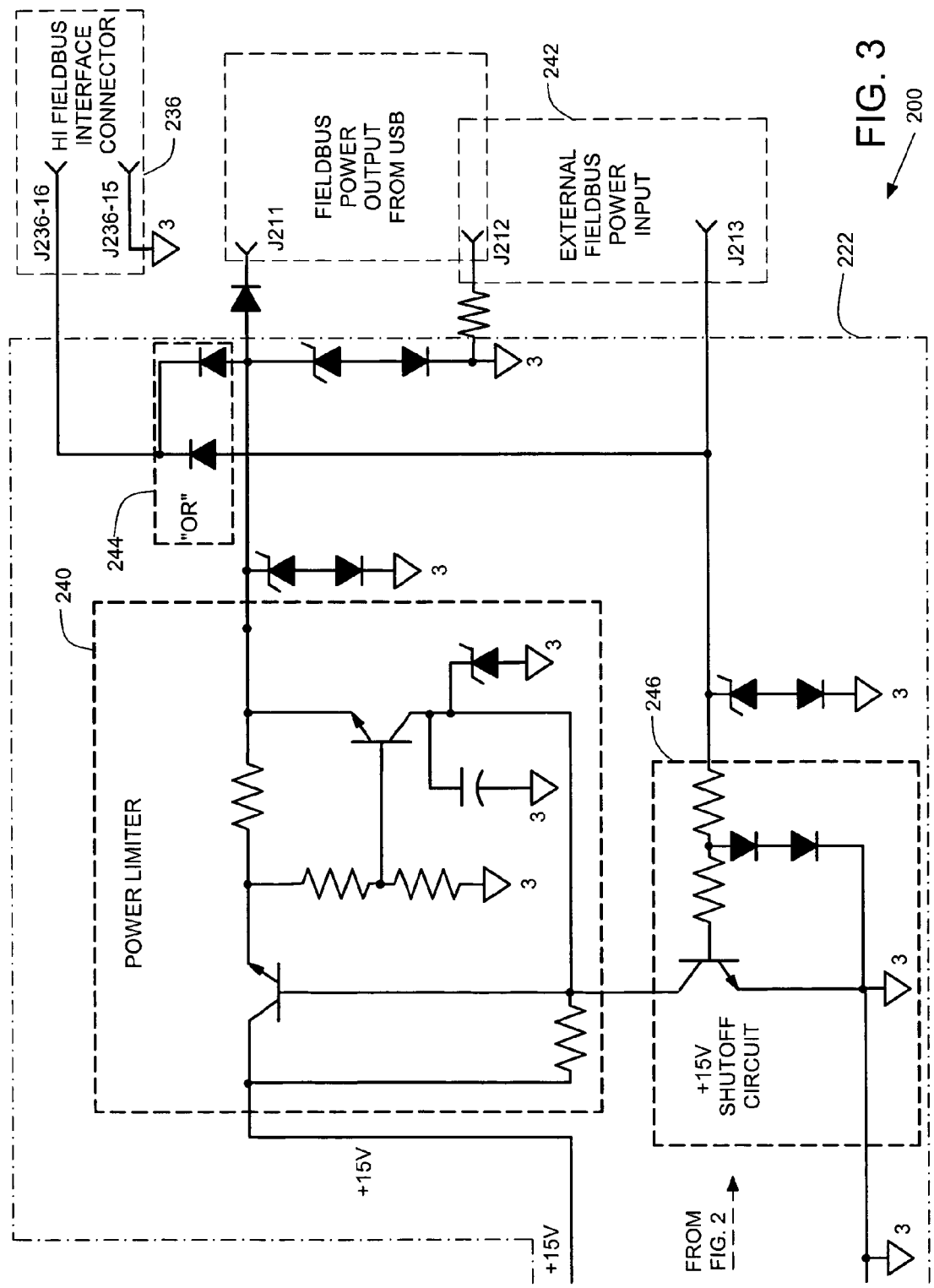

FIGS. 2-3 illustrate a bridge 200. FIGS. 2-3 are best understood when arranged along side one another to form a complete diagram of the bridge 200.

The bridge 200 includes a data format converter 208 (FIG. 2) coupled in cascade with a galvanic isolating coupler 210, an H1 fieldbus to SCI data format converter 237 and an H1 Fieldbus Interface 236 (portions shown in both FIGS. 2, 3).

The data format converter 237 converts (TX/RX) formatted data received from the H1 fieldbus interface 236 to SCI-formatted data. The SCI-formatted data couples through the galvanic isolating coupler 210 to the converter 208. the data format converter 208 provides USB data 213 on USB contacts USB-2, USB-3 which are part of USB interface 230. The galvanic isolating coupler 210 includes a first insulating barrier 212 that provides galvanic isolation between the fieldbus line 202 and the converter 208. The coupler 210 comprises a bidirectional magnetoresistive coupler. In a preferred arrangement, the coupler 210 comprises an ADUM 1301 available from Analog Devices, One Technology Way, Norwood, Mass. 02062-9106 USA.

The bridge 200 also includes a regulator 222 that comprises circuitry in FIGS. 2-3 that is surrounded by a broken line of alternating dots and dashes. The regulator 222 couples power between pins USB-1, USB-4, which are part of the USB interface 230, to the fieldbus lines J236-16, J236-15 (FIG. 3) which are part of the H1 fieldbus interface connector 236. The regulator 222 includes a second insulating barrier 224.

The regulator 222 comprises a power limiter 240 that sets a power limit for power flow from the pins USB-1, USB-4 to ANY fieldbus line. The bridge includes an external fieldbus power input 242. The power limiter 240 in the regulator 222 senses power availability at the external fieldbus power input 242 and automatically reduces power drawn from pins USB-1, USB-4 when power is applied to the external fieldbus power input 242.

In this embodiment, the regulator 222 comprises a diode "OR" circuit 244 that provides power to the fieldbus line J236-15 and J236-16 from either USB-1, USB-4, or the external fieldbus power input 242. The diode "OR" circuit 244 blocks power flow from the fieldbus line J236-16 back into the regulator 222 when power is supplied by the external fieldbus power input 242.

The regulator 222 comprises a shutoff circuit 246 that shuts off power taken from USB-1 when power is provided at the external fieldbus power input 242.

The regulator 222 includes an isolated DC-to-DC converter 248 that includes the second insulating barrier 224. The DC-to-Dc converter 248 preferably comprises a part DCP010515 available from Burr-Brown, 6730 S. Tucson Blvd., Tucson, Ariz. 85706 USA. The converter 208 provides a suspend output 250 that is coupled to the isolated DC-to-DC converter 248 for suspending operation of the DC-to-DC converter 248 when the USB interface 230 is idle. In a preferred arrangement, the converter 208 automatically senses protocol characteristics such as clock rate on the H1 fieldbus interface connector lines TX, RX, RTS and adjusts operation to accommodate the sensed protocol characteristics.

Figure 4:
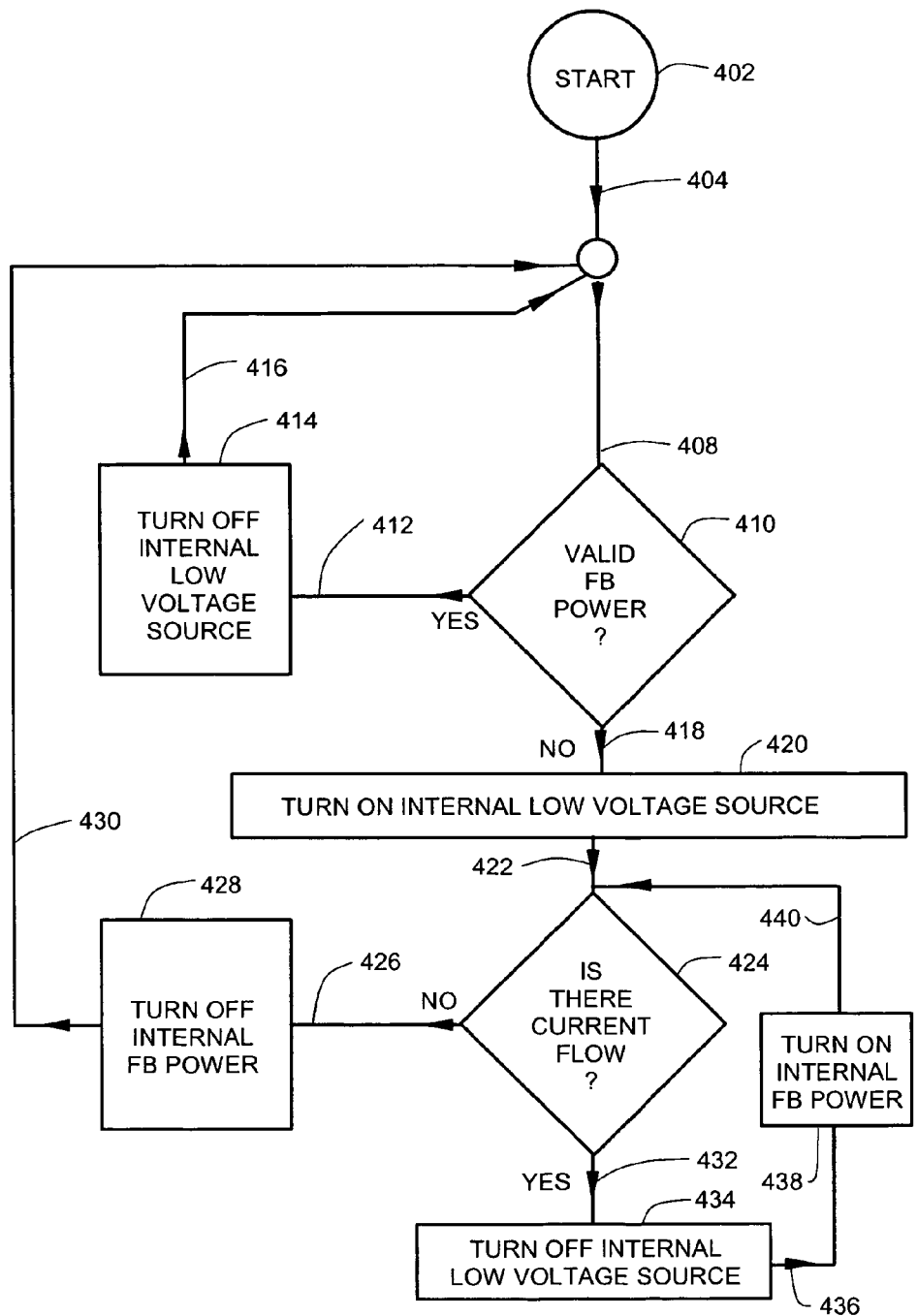
FIG. 4 illustrates a flow chart of control of a power limiter circuit.

FIG. 4 illustrates a flow chart of one embodiment of a control method for a power limiter circuit such as power limiter circuit 240 in FIG. 3. Operation begins at start 402 and continues along line 404, 408 to decision block 410. At decision block 410, the circuit detects whether fieldbus power is valid, which indicates whether a fieldbus line is connected to the bridge. If fieldbus power is valid, then the program continues along line 412 to action block 414. At action block 414, the internal low voltage source is turned off, and then the program continues along lines 416, 408 back to decision block 410. If the fieldbus power is not valid at decision block 410, the program continues along line 418 to action block 420.

At action block 420, the internal low voltage source is turned on, and then the program continues along line 422 to decision block 424. If there is no current flow detected at decision block 424, then program flow continues along line 426 to action block 428. At action block 428, the internal fieldbus power is turned off, and then program flow continues along lines 430, 408 back to decision block 410. If there is current flow detected at decision block 424, then program flow continues along line 432 to action block 434.

At action block 434, the internal low voltage source is turned off and program flow continues along line 436 to action block 438. At action block 438, internal fieldbus power is turned on and then program flow continues along line 440 back to decision block 424.

The processes illustrated in FIG. 4 can be performed by analog, digital, or a combination of analog and digital circuits. The processes illustrated in FIG. 4 preferably run in the background while the bridge is transferring data between the fieldbus line and the host. The processes illustrated in FIG. 4 can adjust power supply management in the bridge based on continuous checking to find out if a cable is connected, and whether the cable provides a power supply voltage that can be used to energize portions of bridge circuitry.

Figure 5:
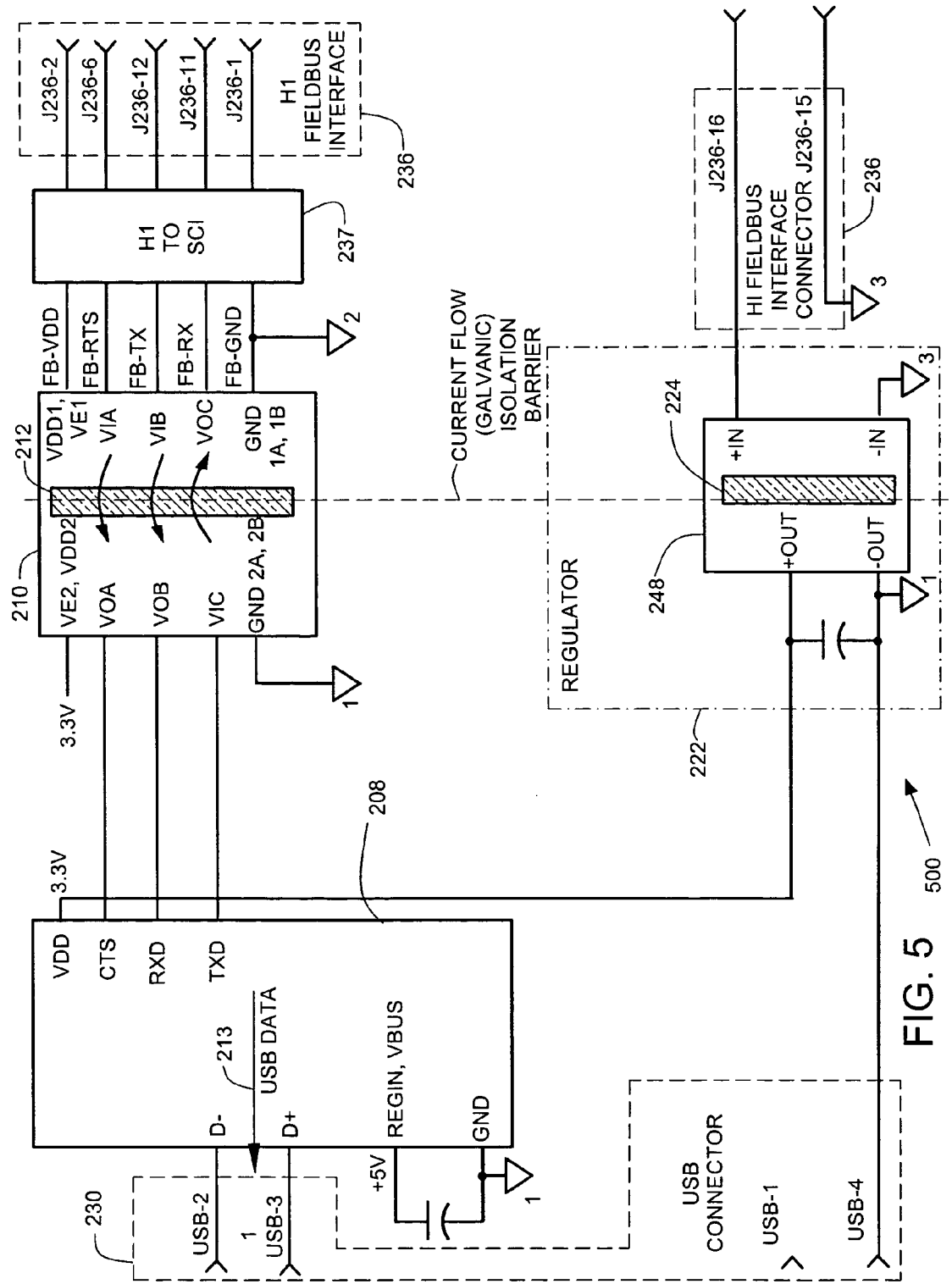
FIG. 5 illustrates a second embodiment of a bridge that is connectable to a host that is not capable of providing USB power for energizing the bridge.

FIG. 5 illustrates an embodiment of a bridge 500 that is similar to the bridge 200 (FIGS. 2-3), however, the bridge 500 is designed for connection to host, such as a battery-powered personal digital assistant (PDA) that is not capable of providing USB power for energizing the bridge 500. In FIG. 5, reference numbers that are the same as reference numbers used in FIGS. 2-3 identify the same or similar features. In bridge 500, the regulator 222 includes a DC/DC converter 248 with a galvanic barrier 224. The output of DC/DC converter 248 is coupled to the converter 208 and coupler 210 to energize the converter 208 and coupler 210. The input of the DC/DC converter 248 is coupled to the fieldbus line at contacts J236-15 and J236-16. The DC/DC converter 248 couples power from the fieldbus interface to the converter 208.

Figure 6:
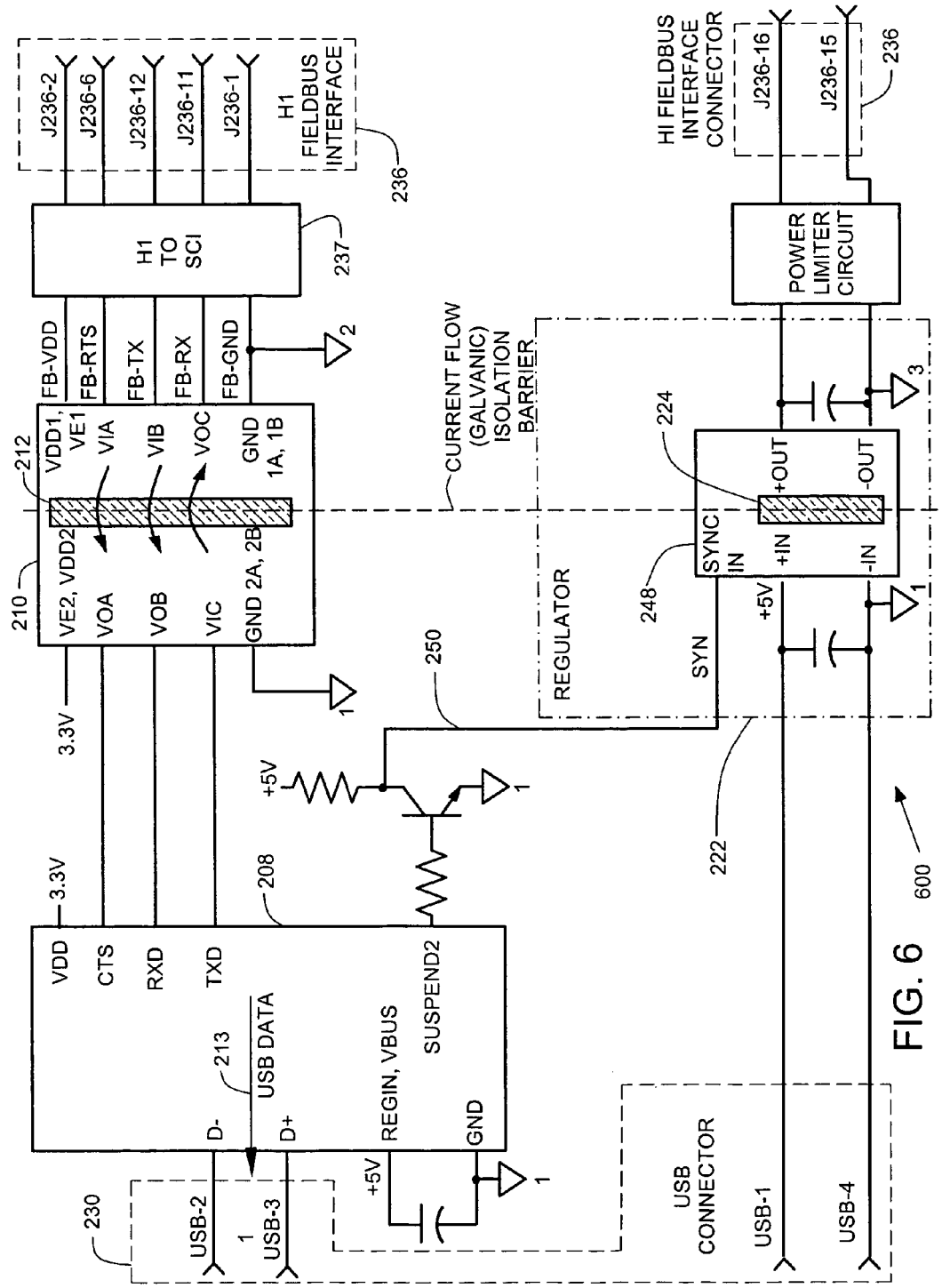
FIG. 6 illustrates an third embodiment of a bridge 600 that connectable to a host that provides USB power to energize the bridge and also to energize a fieldbus line.

FIG. 6 illustrates an embodiment of a bridge 600 that is similar to the bridge 200 (FIGS. 2-3), however, the bridge 600 is designed for connection to a host that is capable of providing USB power for energizing the bridge 600 and also for energizing a fieldbus line. In FIG. 6, reference numbers that are the same as reference numbers used in FIGS. 2-3 identify the same or similar features. In bridge 600, the regulator 222 includes a DC/DC converter 248 with a galvanic barrier 224. The output of DC/DC converter 248 is coupled to J236-15 and J236-16 to energize the fieldbus line. The input of the DC/DC converter 248 is coupled to pins USB-1 and USB-4 of the USB connector. The DC/DC converter 248 couples power from the bridge USB interface to the fieldbus interface.

Features described in connection with one embodiment can be appropriately adapted for use in another embodiment.

Although the present invention has been described with reference to preferred embodiments, workers skilled in the art will recognize that changes may be made in form and detail without departing from the scope of the invention.

What is claimed is:

1. A system for coupling data received in fieldbus format from a fieldbus interface to a network connection, comprising:
    a data format converter coupled between the fieldbus interface and a bridge USB interface, the converter convening the data to USB-formatted data;
    a coupler coupled in cascade with the converter, and including a first insulating barrier;
    a host that receives the USB-formatted data, and that includes a data server interface presenting the data to the network connection; and
    a regulator coupling the power to the fieldbus interface to thereby power the fieldbus interface, the regulator including a DC-to-DC converter having a second insulating barrier such that data and power are isolatingly coupled between the fieldbus interface and the bridge USB interface;
    the regulator including a power limiter circuit that:
    detects whether fieldbus power is valid, and turns off the DC-to-DC converter if the fieldbus power is detected to be valid, and turns on the DC-to-DC converter if the fieldbus power is detected to be not valid; and
    detects whether there is current flow and turns off the fieldbus power if there is no current flow, and turns off the DC-to-DC converter and turns on the fieldbus power on if there is current flow.

2. The system of claim 1 wherein the coupler comprises a bidirectional magnetoresistive coupler.

3. The system of claim 1 wherein the coupler comprises a bidirectional optical coupler.

4. The system of claim 1 wherein the host comprises a fieldbus data table coupled to the data server interface.

5. The system of claim 1 wherein the data format converter, coupler and regulator are included in a bridge.

6. The system of claim 5 wherein the bridge USB interface couples to the data format converter and the regulator, the host comprises a host USB interface, and the system further comprises a USB cable coupled between the bridge and host USB interfaces.

7. The system of claim 6 wherein the power limiter sets a power limit for power flow between the bridge USB interface to the fieldbus interface.

8. The system of claim 7 wherein the regulator comprises a shutoff circuit that senses power availability at the fieldbus interface and automatically reduces power drawn from the bridge USB interface when a fieldbus line applies power to the fieldbus interface.

9. The system of claim 8 wherein the regulator comprises a diode "OR" circuit drawing power from either the bridge USB interface or the fieldbus line, the diode "OR" circuit blocking power flow from the fieldbus line back into the regulator when power is supplied by the fieldbus line.

10. The system of claim 8 wherein the shutoff circuit couples to the power limiter to the shut off power taken from the bridge USB interface when power is provided at the fieldbus line.

11. The system of claim 1 wherein the regulator includes an isolated DC-to-DC converter that includes the second insulating barrier.

12. The system of claim 11 wherein the converter provides a suspend output that is coupled to the isolated DC-to-DC converter for suspending operation of the DC-to-DC converter when the bridge USB interface is idle.

13. The system of claim 1 wherein the converter automatically senses protocol characteristics at the fieldbus interface and adjusts its operation to the sensed protocol characteristics.

14. The system of claim 1 wherein the regulator comprises a DC/DC converter that couples power from the bridge USB interface to the fieldbus interface.

15. The system of claim 1 wherein the regulator comprises a DC/DC converter that couples power from the fieldbus interface to the converter.

16. A method for coupling fieldbus data from a fieldbus line to a network line, comprising:
    converting the fieldbus data to USB data;
    coupling a first insulating barrier in cascade with the converting;
    receiving the USB data at a host, providing the host with a data server interface and a network connection, the data server interface presenting the USB data to the network connection;

configuring a regulator to receive power from either a USB interface or an external power source, and coupling the power received from the USB interface to the fieldbus line through a DC-to-DC converter having a second insulating barrier to thereby power the fieldbus line such that data and power are isolatingly coupled between the fieldbus interface and the network connection; and limiting power by:

detecting whether fieldbus power is valid, and turning off the DC-to-DC converter if the field bus power is detected to be valid; and turning off the DC-to-DC converter if the fieldbus power is detected to be not valid; and detecting whether there is current flow and turning off the fieldbus power if there is no current flow, and turning off the DC-to-DC converter and turning on the fieldbus power if there is no current flow.

17. The method of claim 16, and:
providing a bidirectional magnetoresistive coupler that includes the first insulating barrier.

18. The method of claim 16, and:
providing a bidirectional optical coupler that includes the first insulating barrier.

19. The method of claim 16, and:
coupling data in the host from a fieldbus data table to a data server interface.

20. The method of claim 16, and:
providing a bridge to perform the converting, the coupling of the first insulation barrier and coupling of power.

21. The method of claim 20, and:
coupling data between a bridge USB interface in the bridge to a host USB interface in the host via a USB cable.

22. The method of claim 21, and:
setting a power limit for power flow from the bridge USB interface to the fieldbus interface.

23. The method of claim 21, and:
sensing power availability at the fieldbus interface and automatically reducing power drawn from the bridge USB interface when power is supplied by a fieldbus line.

24. The method of claim 23, and:
providing power to the fieldbus line through a diode "OR" circuit from either the first USB interface or the fieldbus line, the diode "OR" circuit blocking power flow from the fieldbus line back into the regulator when power is supplied by the fieldbus line.

25. The method of claim 21, and:
shutting off power taken from the first USB interface when power is provided at the external fieldbus power input.

26. The method of claim 16, and:
providing an isolated DC-to-DC converter that includes the second insulating barrier in the regulator.

27. The method of claim 26, and:
providing a suspend output to the isolated DC-to-DC converter for suspending operation of the DC-to-DC converter when the bridge USB interface is idle.

28. The method of claim 16, and:
automatically sensing protocol characteristics on the fieldbus line and adjusts operation to the sensed protocol characteristics.

29. The method of claim 16 wherein the coupling of power includes DC/DC converting that couples power from the bridge USB interface to the fieldbus interface.

30. The method of claim 16 wherein the coupling of power includes DC/DC conversion that couples power from the fieldbus interface to the converter.

31. A system for coupling data received in fieldbus format from a fieldbus interface to a host, comprising:

a data format converter coupled between the fieldbus interface and a bridge USB interface, the converter converting the data to USB-formatted data that is couplable to the host;

a coupler coupled in cascade with the converter, and including a first insulating barrier; and a regulator configured to receiving power from either the bridge USB interface or an external power source, the regulator coupling power to the fieldbus interface, the regulator including a DC-to-DC converter having a second insulating barrier such that data and power are isolatingly coupled between the fieldbus interface and the bridge USB interface; the regulator including a power limiter circuit that:

detects whether fieldbus power is valid, and turns off the DC-to-DC converter if the fieldbus power is detected to be valid, and turns on the DC-to-DC converter if the fieldbus power is detected to be not valid; and detects whether there is current flow and turns off the fieldbus power if there is no current flow, and turns off the DC-to-DC converter and turns on the fieldbus power on if there is current flow.

32. The system of claim 1 wherein the external power source comprises an external fieldbus power input coupled to the regulator, and the regulator senses power availability at the external fieldbus power input and automatically reduces power drawn from the bridge USB interface when power is applied to the external fieldbus power input.

33. The method of claim 16 and further wherein the external power source comprises an external fieldbus power input coupling to the regulator, and the regulator sensing power availability at the external fieldbus power input and automatically reducing power coupled from the host when power is available from the external fieldbus power input.

34. The system of claim 31 wherein the external power source comprises an external fieldbus power input coupled to the regulator, and the regulator senses power availability at the external fieldbus power input and automatically reduces power drawn from the bridge USB interface when power is applied to the external fieldbus power input.

* * * * *